United States Patent …

(12) United States Patent
Hu et al.

(10) Patent No.: US 11,881,555 B2
(45) Date of Patent: Jan. 23, 2024

(54) NON-AQUEOUS ELECTROLYTE FOR LITHIUM ION BATTERY AND LITHIUM ION BATTERY

(71) Applicant: SHENZHEN CAPCHEM TECHNOLOGY CO., LTD., Guangdong (CN)

(72) Inventors: Shiguang Hu, Guangdong (CN); Qiao Shi, Guangdong (CN); Zhaohui Deng, Guangdong (CN); Xionggui Lin, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 511 days.

(21) Appl. No.: 16/770,281

(22) PCT Filed: Jun. 27, 2018

(86) PCT No.: PCT/CN2018/092969
§ 371 (c)(1),
(2) Date: Jun. 5, 2020

(87) PCT Pub. No.: WO2019/119765
PCT Pub. Date: Jun. 27, 2019

(65) Prior Publication Data
US 2020/0313237 A1 Oct. 1, 2020

(30) Foreign Application Priority Data

Dec. 21, 2017 (CN) .......................... 201711391825.0

(51) Int. Cl.
H01M 10/0567 (2010.01)
H01M 10/0525 (2010.01)

(52) U.S. Cl.
CPC ... *H01M 10/0567* (2013.01); *H01M 10/0525* (2013.01); *H01M 2300/0025* (2013.01)

(58) Field of Classification Search
CPC .................. H01M 10/0525; H01M 2300/0025
See application file for complete search history.

(56) References Cited

FOREIGN PATENT DOCUMENTS

| CN | 104718658 A | | 6/2015 |
| CN | 106252710 A | | 12/2016 |
| JP | 2000123867 A | | 4/2000 |
| JP | 2006219406 A | | 8/2006 |
| JP | 2011238373 | * | 11/2011 |
| JP | 2011238373 A | * | 11/2011 |
| JP | 2015072863 | * | 4/2015 |
| JP | 2015072863 A | * | 4/2015 |
| JP | 2015092476 | * | 5/2015 |
| JP | 2015092476 A | | 5/2015 |

OTHER PUBLICATIONS

International Search Report of PCT Patent Application No. PCT/CN2018/092969 dated Sep. 27, 2018.

* cited by examiner

Primary Examiner — Lucas J. O'Donnell

(57) ABSTRACT

In order to solve the problems of insufficient high-temperature storage performance and high-temperature cycle performance of the existing lithium ion battery, the present application provides a non-aqueous electrolyte for lithium ion battery, comprising a bicyclic sulfate compound and a compound A represented by structural formula 1. In structural formula 1, $R_3$, $R_4$, $R_5$, $R_6$, $R_7$ and $R_8$ are each independently selected from hydrogen, fluorine atom or a group containing 1~5 carbon atoms. Meanwhile, the application also discloses a lithium ion battery comprising the non-aqueous electrolyte for lithium ion battery. The non-aqueous electrolyte for lithium ion battery provided by the application is beneficial to improving high-temperature storage and high-temperature cycle performance of battery.

Structural formula 1

9 Claims, No Drawings

NON-AQUEOUS ELECTROLYTE FOR LITHIUM ION BATTERY AND LITHIUM ION BATTERY

TECHNICAL FIELD

The present application belongs to the technical field of lithium ion batteries, and particularly relates to a non-aqueous electrolyte for lithium ion battery and a lithium ion battery.

BACKGROUND

Lithium ion battery has made great progress in the field of portable electronic products because of its high working voltage, high safety, long life and no memory effect. At the same time, with the development of new energy vehicles, lithium ion batteries have great application prospects in power supply systems for new energy vehicles.

In non-aqueous electrolyte lithium ion batteries, non-aqueous electrolyte is the key factor that affects the high and low temperature performances of battery. In particular, additives in non-aqueous electrolyte are especially important for the high and low temperature performances of battery. During the initial charge of the lithium ion battery, lithium ions in positive electrode material of the battery are released and embedded into carbon negative electrode through electrolyte. Due to its high reactivity, the electrolyte reacts on the surface of the carbon negative electrode to produce compounds such as $Li_2CO_3$, LiO, LiOH, etc., thus forming a passivation film on the surface of the negative electrode, which is called a solid electrolyte interface film (SEI). The SEI film formed during the initial charge not only prevents the electrolyte from further decomposing on the surface of the carbon negative electrode, but also acts as a lithium ion tunnel, allowing the passage of only lithium ions. Therefore, the SEI film determines the performances of lithium ion battery.

In order to improve the various performances of lithium ion battery, many researchers have tried to improve the quality of SEI film by adding different negative film-forming additives (such as vinylene carbonate, fluoroethylene carbonate, vinyl ethylene carbonate) to the electrolyte. For example, Japanese Patent Laid-Open No. 2000-123867 proposes to improve battery performances by adding vinylene carbonate to the electrolyte. Vinylene carbonate can take a reduction decomposition reaction on the surface of the negative electrode prior to solvent molecules, and form a passivation film on the surface of the negative electrode to prevent further decomposition of electrolyte on the surface of the electrode, thus improving the cycle performance of the battery. However, after the addition of vinylene carbonate, the battery is prone to generate gas during high-temperature storage, causing the battery to expand. In addition, the passivation film formed with vinylene carbonate has high impedance, especially at low temperature where lithium precipitation is likely to occur during charge, which affects the safety of the battery. Fluoroethylene carbonate can also form a passivation film on the surface of the negative electrode to improve the cycle performance of the battery, and the formed passivation film has relatively low impedance and can improve the low-temperature discharge performance of the battery. However, fluoroethylene carbonate produces more gas when stored at high-temperature, which obviously reduces the high-temperature storage performance of the battery. Chinese patent CN 106252710A discloses a lithium ion battery non-aqueous electrolyte containing bicyclic sulfate compound, which can inhibit gas production when stored at high-temperature, thereby improving the high-temperature storage performance of the battery. However, the applicant found through a large number of experiments that although the bicyclic sulfate-containing compound can improve the high-temperature storage performance of the battery, the high-temperature storage performance and the high-temperature cycle performance still need to be further improved.

SUMMARY

Aiming at the problem that the existing lithium ion battery has insufficient high-temperature storage performance and high-temperature cycle performance, the present application provides a non-aqueous electrolyte for lithium ion battery, and a lithium ion battery.

The technical solution adopted by the application for solving the technical problem is as follows:

In one aspect, the application provides a non-aqueous electrolyte for lithium ion battery, comprising a bicyclic sulfate compound and a compound A represented by structural formula 1:

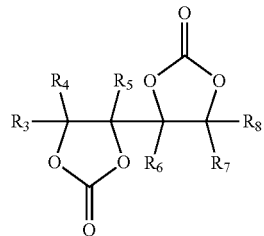

Structural formula 1

In structural formula 1, $R_3$, $R_4$, $R_5$, $R_6$, $R_7$ and $R_8$ are each independently selected from hydrogen, fluorine atom or a group containing 1~5 carbon atoms.

Optionally, the group containing 1~5 carbon atoms is selected from hydrocarbyl, halogenated hydrocarbyl, oxygen-containing hydrocarbyl, silicon-containing hydrocarbyl, or cyano-containing substituted hydrocarbyl.

Optionally, $R_3$, $R_4$, $R_5$, $R_6$, $R_7$ and $R_8$ are each independently selected from hydrogen atom, fluorine atom, methyl group, ethyl group, methoxy group, ethoxy group, trimethylsiloxy group, cyano group, or trifluoromethyl group.

Optionally, the compound A represented by structural formula 1 is selected from the following compounds:

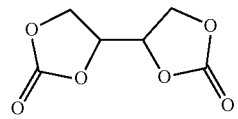

Compound 1

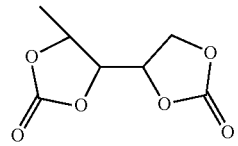

Compound 2

-continued

Compound 3
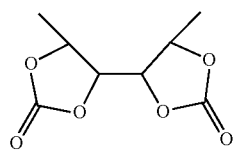

Compound 4
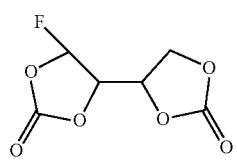

Compound 5
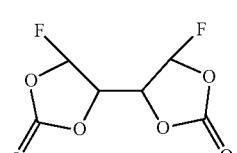

Compound 6
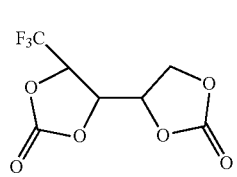

Compound 7
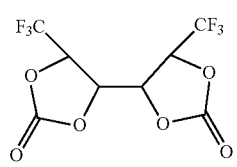

Compound 8
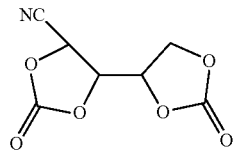

Compound 9
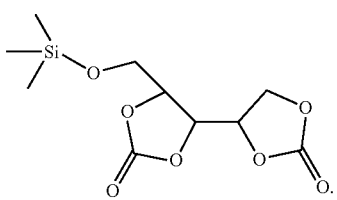

Optionally, the bicyclic sulfate compound is selected from compound B represented by structural formula 2 and/or compound C represented by structural formula 3:

Structural formula 2
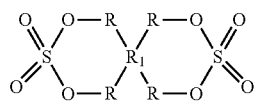

In structural formula 2, $R_1$ is

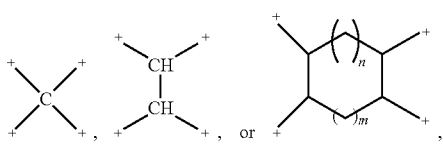

R is a single bond or methylene group; and m is an integer of 1-4, n is an integer of 0-2;

Structural formula 3
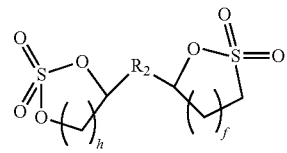

In structural formula 3, $R_2$ is a single bond, alkyl with 1-5 carbon atoms, oxyalkyl with 1-5 carbon atoms,

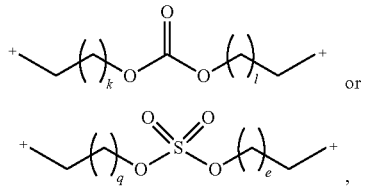

h and f are integers of 1 or 2, k, l, q and e are integers of 0-4.

Optionally, the compound B represented by structural formula 2 is selected from the following compounds:

Compound 10
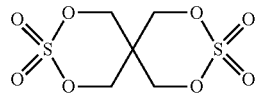

Compound 11
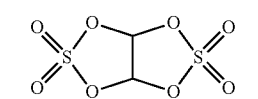

the compound C represented by structural formula 3 is selected from the following compounds:

Compound 12
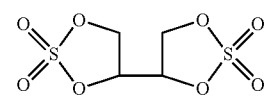

Compound 13
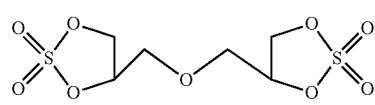

Compound 14

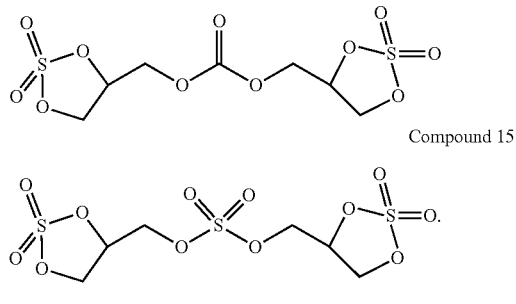

Compound 15

Optionally, the percentage mass content of the bicyclic sulfate compound is 0.1%~5.0% and the compound A is 0.1%~5.0% based on the total mass of the non-aqueous electrolyte for lithium ion battery being 100%.

Optionally, the non-aqueous electrolyte further comprises at least one of unsaturated cyclic carbonate, fluorinated cyclic carbonate, cyclic sultone, and cyclic sulfate.

Optionally, the unsaturated cyclic carbonate comprises at least one of vinylene carbonate, vinyl ethylene carbonate, and methylene ethylene carbonate;

the fluorinated cyclic carbonate comprises at least one of fluoroethylene carbonate, trifluoromethyl ethylene carbonate and di-fluoro ethylene carbonate;

the cyclic sultone comprises at least one of 1,3-propane sultone, 1,4-butane sultone and prop-1-ene-1,3-sultone;

the cyclic sulfate is selected from at least one of ethylene sulfate and 4-methyl-1,3,2-dioxathiolane-2,2-dioxide.

In another aspect, the present application provides a lithium ion battery, comprising a positive electrode, a negative electrode, a separator interposed between the positive electrode and the negative electrode, and the non-aqueous electrolyte for lithium ion battery as described above.

According to the present application, the non-aqueous electrolyte for lithium ion battery is added with a bicyclic sulfate compound, and the bicyclic sulfate compound can form a passivation film on the surface of negative electrode, but the stability of the passivation film needs to be further improved. The applicant found through a large number of experiments that when the bicyclic sulfate compound and the compound A presented by structural formula 1 are used together, they can be decomposed on the surface of the negative electrode together to form a composite passivation film. The composite passivation film has higher thermal stability than a passivation film formed by a compound containing only bicyclic sulfate or the compound presented by structural formula 1 alone, and can further inhibit gas expansion of the battery when stored at high-temperature, thereby further improving the retention and recovery capability of the high-temperature storage capacity of the battery and further improving the high-temperature cycle performance of the battery.

DETAILED DESCRIPTION OF DISCLOSED EMBODIMENTS

In order to make the technical problems to be solved, technical solutions and beneficial effects more apparent and clearer, the present application will be described in further detail below with reference to embodiments. It should be understood that the specific embodiments described herein are only for the purpose of explaining the present invention and are not intended to limit the present invention.

The embodiment of the invention provides a non-aqueous electrolyte for lithium ion battery, comprising a bicyclic sulfate compound and a compound A represented by structural formula 1:

Structural formula 1

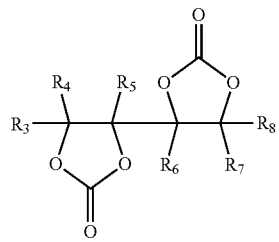

In structural formula 1, $R_3$, $R_4$, $R_5$, $R_6$, $R_7$ and $R_8$ are each independently selected from hydrogen, fluorine atom or a group containing 1~5 carbon atoms.

When the bicyclic sulfate compound and the compound A presented by structural formula 1 are used together, the two can be decomposed on the surface of the negative electrode together to form a composite passivation film. The composite passivation film has higher thermal stability than a passivation film formed by a compound containing only bicyclic sulfate or the compound presented by structural formula 1 alone, and can further inhibit gas expansion of the battery when stored at high-temperature, thereby further improving the retention and recovery capability of the high-temperature storage capacity of the battery and further improving the high-temperature cycle performance of the battery.

In some embodiments, the group containing 1~5 carbon atoms is selected from hydrocarbyl, halogenated hydrocarbyl, oxygen-containing hydrocarbyl, silicon-containing hydrocarbyl, or cyano-containing substituted hydrocarbyl.

In some embodiments, $R_3$, $R_4$, $R_5$, $R_6$, $R_7$ and $R_8$ are each independently selected from hydrogen atom, fluorine atom, methyl group, ethyl group, methoxy group, ethoxy group, trimethylsiloxy group, cyano group, or trifluoromethyl group.

In some embodiments, the compound A represented by structural formula 1 is selected from the following compounds:

Compound 1

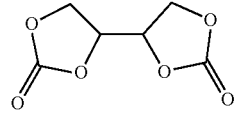

Compound 2

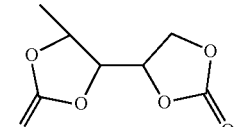

Compound 3

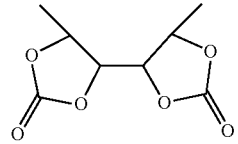

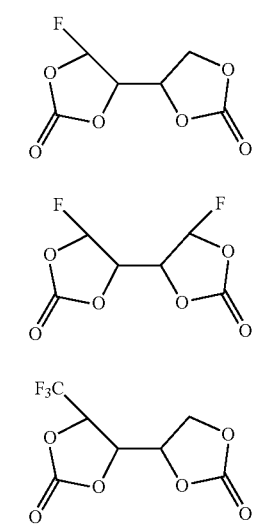

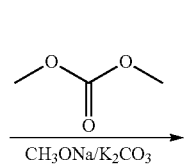

It should be noted that the above are some compounds claimed by the present application, but they are not limited thereto and should not be construed as limiting the application.

The compound A represented by structural formula 1 above can be prepared by ester exchange reaction of polyols (such as erythritol, xylitol, etc.) and carbonates (such as dimethyl carbonate, diethyl carbonate, ethylene carbonate, etc.) in the presence of alkaline catalyst, followed by recrystallization or column chromatography purification. The specific synthetic route is as follows:

Compound 4

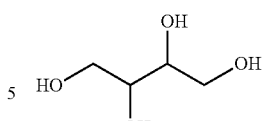

Compound 5

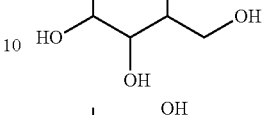

Compound 6

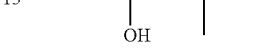

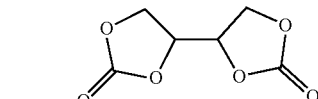

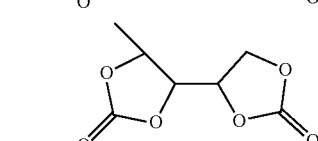

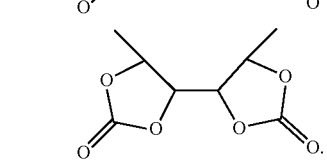

The fluorine-containing compound in compound A is prepared by fluorinating the corresponding carbonate and the mixture of $F_2/N_2$, and then purified by recrystallization or column chromatography. An example of its synthetic route is as follows:

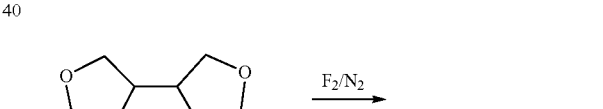

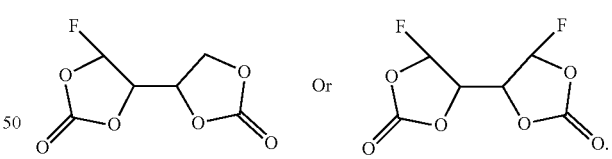

The cyano-containing compound in compound A is prepared by performing chlorination reaction on the corresponding carbonate and sulfonyl chloride, and reacting with NaCN or KCN, then purified by recrystallization or column chromatography. An example of its synthetic route is as follows:

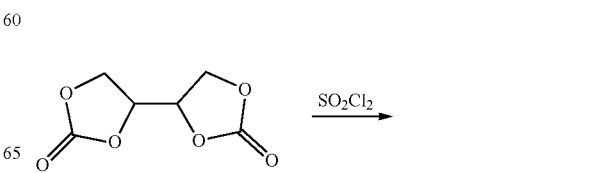

-continued

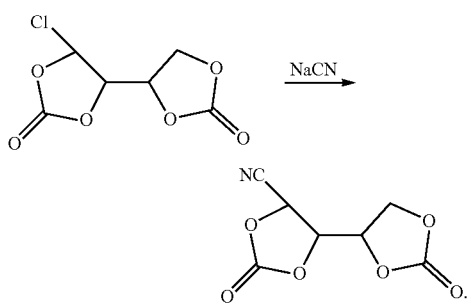

The trimethylsiloxy-containing compound in compound A is prepared by performing substitution reaction on the corresponding hydroxy carbonate and silazane, then purified by recrystallization or column chromatography. An example of its synthetic route is as follows:

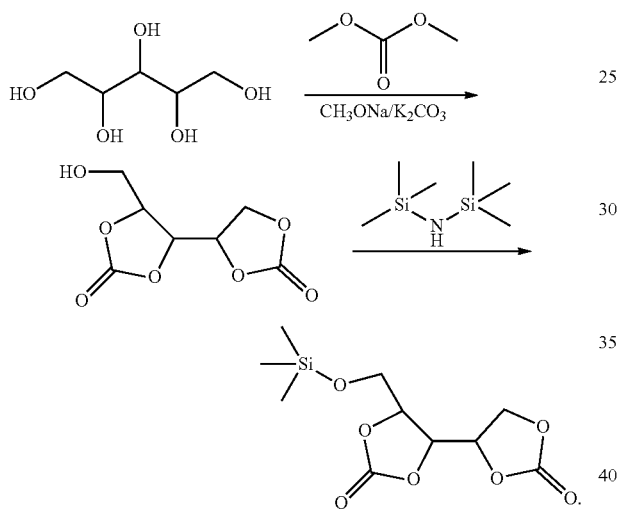

In some embodiments, the bicyclic sulfate compound is selected from compound B represented by structural formula 2 and/or compound C represented by structural formula 3:

Structural formula 2

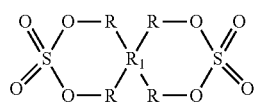

In structural formula 2, $R_1$ is

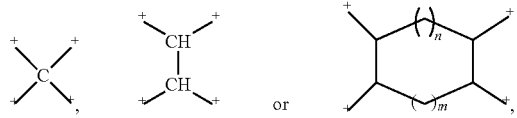

R is a single bond or methylene group; and m is an integer of 1-4, n is an integer of 0-2;

Structural formula 3

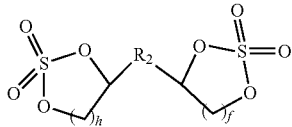

In structural formula 3, $R_2$ is a single bond, alkyl with 1-5 carbon atoms, oxyalkyl with 1-5 carbon atoms,

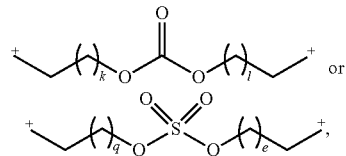

h and f are integers of 1 or 2, k, l, q and e are integers of 0-4.

In a more preferred embodiments, the compound B represented by structural formula 2 is selected from the following compounds:

Compound 10

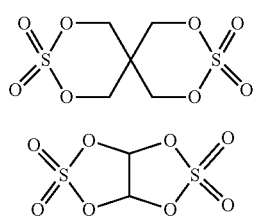

Compound 11

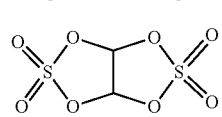

the compound C represented by structural formula 3 is selected from the following compounds:

Compound 12

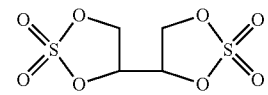

Compound 13

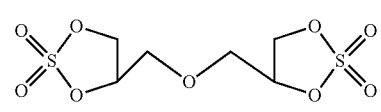

Compound 14

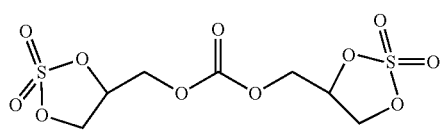

Compound 15

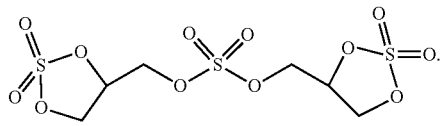

In some embodiments, the percentage mass content of the bicyclic sulfate compound is 0.1%~5.0% and the compound A is 0.1%~5.0% based on the total mass of the non-aqueous electrolyte for lithium ion battery being 100%.

The non-aqueous electrolyte further comprises at least one of unsaturated cyclic carbonate, fluorinated cyclic carbonate, cyclic sultone, and cyclic sulfate.

In a more preferred embodiment, the unsaturated cyclic carbonate comprises at least one of vinylene carbonate (CAS: 872-36-6, VC), vinyl ethylene carbonate (CAS: 4427-96-7, VEC), and methylene ethylene carbonate (CAS: 124222-05-5);

The fluorinated cyclic carbonate comprises at least one of fluoroethylene carbonate (CAS: 114435-02-8, FEC), trifluoromethyl ethylene carbonate (CAS: 167951-80-6) and difluoro ethylene carbonate (CAS: 311810-76-1);

The cyclic sultone comprises at least one of 1,3-propane sultone (CAS: 1120-71-4, PS), 1,4-butane sultone (CAS: 1633-83-6) and propene-1,3-sultone (CAS: 21806-61-1);

The cyclic sulfate is selected from at least one of ethylene sulfate (CAS: 1072-53-3, DTD) and 4-methyl-1,3,2-dioxathiolane-2,2-dioxide (CAS: 5689-83-8).

The same as that in the prior art, the non-aqueous electrolyte for lithium ion battery contains solvents and lithium salts, and there is no special limitation on the type or content of the solvent for the present application, for example, the solvent of the non-aqueous electrolyte for lithium ion battery comprises cyclic carbonate and chain carbonate.

Optionally, the cyclic carbonate comprises at least one of ethylene carbonate, propylene carbonate, and butylene carbonate; The chain carbonate comprises at least one of dimethyl carbonate, diethyl carbonate, methyl ethyl carbonate and methyl propyl carbonate.

The lithium salt of the present invention is not particularly limited, the existing lithium salts may be used, for example, the lithium salt may be selected from at least one of $LiPF_6$, $LiBF_4$, LiBOB, LiDFOB, $LiN(SO_2CF_3)_2$ and $LiN(SO_2F)_2$. The content of the lithium salt can vary within a large range, and preferably, the content of the lithium salt in the non-aqueous electrolyte for lithium ion battery is 0.1-15%.

Another embodiment of the present invention discloses a lithium ion battery, comprising a positive electrode, a negative electrode, a separator interposed between the positive electrode and the negative electrode, and the non-aqueous electrolyte for lithium ion battery as described above.

The positive electrode comprises a positive electrode active material, wherein the positive electrode active material is at least one of $LiNi_xCo_yMnzL_{(1-x-y-z)}O_2$, $LiCo_xL_{(1-x')}O_2$, $LiNi_{x'}L'_{y'}Mn_{(2-x''-y')}O_4$ and $Li_zMPO_4$; wherein L is at least one of Al, Sr, Mg, Ti, Ca, Zr, Zn, Si and Fe; $0 \le x \le 1$, $0 \le y \le 1$, $0 \le z \le 1$, $0 < x+y+z \le 1$, $0 < x' \le 1$, $0.3 \le x'' \le 0.6$, $0.01 \le y' \le 0.2$; L' is at least one of Co, Al, Sr, Mg, Ti, Ca, Zr, Zn, Si and Fe; $0.5 \le z' \le 1$, m is at least one of Fe, Mn and Co.

The negative electrode comprises a negative electrode active material, the negative electrode active material may be made of carbon material, metal alloy, lithium-containing oxide and silicon-containing material. Preferably, the negative electrode active material is selected from artificial graphite and natural graphite. Obviously, it is not limited to the two listed.

The separator is a regular diaphragm in the field of lithium ion batteries, and therefore, it will not be described again.

The lithium ion battery provided by the embodiment of the invention has better high-temperature cycle performance and high-temperature storage performance because it contains the non-aqueous electrolyte described above.

The invention will be further illustrated by the following examples.

Embodiment 1

The embodiment is used for explaining the non-aqueous electrolyte for lithium ion battery, the lithium ion battery and the preparation method thereof, comprising the following steps:

The preparation process of the positive electrode is: mixing a positive electrode active material lithium nickel cobalt manganese oxide ($LiNi_{0.5}Co_{0.2}Mn_{0.3}O_2$), conductive carbon black Super-P and a binder polyvinylidene fluoride (PVDF) according to a mass ratio of 92:4:3, dispersing in N-methyl-2-pyrrolidone (NMP) to obtain positive electrode slurry, uniformly coating the positive electrode slurry on two sides of an aluminum foil, drying, calendering and vacuum drying, then welding an aluminum lead wire with an ultrasonic welder to obtain a positive electrode plate, wherein the thickness of the positive electrode plate is between 120 and 150 μm.

The preparation process of the negative electrode is: mixing artificial graphite, conductive carbon black Super-P, binder styrene butadiene rubber (SBR) and carboxymethyl cellulose (CMC) according to a mass ratio of 94:1:2.5:2.5, dispersing in deionized water to obtain negative electrode slurry, coating the negative electrode slurry on two sides of a copper foil, drying, calendering and vacuum drying, then welding a nickel lead wire with an ultrasonic welder to obtain a negative electrode plate, wherein the thickness of the negative electrode plate is between 120 and 150 μm.

The preparation process of the non-aqueous electrolyte is: mixing a lithium salt, a solvent, the bicyclic sulfate compound and the compound A represented by structural formula 1 to obtain an electrolyte, wherein the bicyclic sulfate compound is selected from compound 10, the compound A represented by structural formula 1 is selected from compound 1, and the bicyclic sulfate compound is 1% and the compound A is 1% based on the total mass of the non-aqueous electrolyte for lithium ion battery being 100%.

The preparation process of the separator is: the separator is made of a three-layer isolation film with a thickness of 20 μm.

The assembly steps of the battery are as follows: the separator of three-layer isolation film is placed between the positive electrode plate and the negative electrode plate, then a sandwich structure consisting of the positive electrode plate, the negative electrode plate and the separator is wound, the wound body is flattened and put into an aluminum foil packaging bag, then vacuum baked at 85° C. for 24 hours, to obtain a battery core to be injected; In a glove box with dew point below −40° C., the electrolyte prepared above is injected into the battery core, and then is vacuum sealed and left standing for 24 hours.

Then, the initial formation charge is performed according to the following steps: charged with 0.05C constant current for 180 min, then charged to 3.95V with 0.2C constant current, vacuum sealed again, then further charged to 4.2V with 0.2C constant current, left standing at room temperature for 24 hours, then discharged to 3.0V with 0.2C constant current to obtain a 4.2V $LiNi_{0.5}Co_{0.2}Mn_{0.3}O_2$/artificial graphite lithium ion battery.

Embodiments 2~14

Embodiments 2~14 are used for illustrating the non-aqueous electrolyte for lithium ion battery, the lithium ion battery and the preparation method thereof, and include most of the operation steps in Embodiment 1, with the difference that:

based on the total weight of the non-aqueous electrolyte being 100%, the non-aqueous electrolyte contains the components (in percentage by mass) shown in Embodiments 2~14 in Table 1.

Comparative Examples 1~6

Comparative Examples 1~6 are used for illustrating the non-aqueous electrolyte for lithium ion battery, the lithium ion battery and the preparation method thereof, and include most of the operation steps in Embodiment 1, with the difference that:
based on the total weight of the non-aqueous electrolyte being 100%, the non-aqueous electrolyte contains the components (in percentage by mass) shown in Comparative Examples 1~6 in Table 1.

Performance Test

The lithium ion batteries prepared in Embodiments 1~14 and Comparative Examples 1~6 were subjected to the following performance tests:

1) High-Temperature Cycle Performance Test

At 45° C., the formed battery was charged with 1C constant current/constant voltage to 4.2V, the cutoff current was 0.01C, and then discharged to 3.0V with 1C constant current. After such charge/discharge for N cycles, the capacity retention rate after N cycles is calculated to evaluate its high-temperature cycle performance.

The calculation formula of the Nth cycle capacity retention rate at 45° C. 1C is as follows:

The $N$th cycle capacity retention rate (%)=(the $N$th cycle discharge capacity/the first cycle discharge capacity)*100%.

2) High-Temperature Storage Performance Test at 60° C.

The formed battery was charged to 4.2V with 1C constant current/constant voltage at room temperature, the cutoff current was 0.01C, then discharged to 3.0V with 1C constant current, the initial discharge capacity of the battery was measured, then charged to 4.2V with 1C constant current/constant voltage, the cutoff current was 0.01C, the initial thickness of the battery was measured, then the battery was stored at 60° C. for N days, the thickness of the battery was measured, then discharged to 3.0V with 1C constant current, the retention capacity of the battery was measured, then charged to 4.2V with 1C constant current/constant voltage, the cutoff current was 0.01C, and then discharged to 3.0V with 1C constant current. The calculation formulas for capacity retention rate and capacity recovery rate are as follows:

Battery capacity retention rate (%)=(retention capacity/initial capacity)*100%;

Battery capacity recovery rate (%)=(recovery capacity/initial capacity)*100%;

Battery thickness expansion rate (%)=(thickness after $N$ days−initial thickness)/initial thickness*100%.

The test results are shown in Table 1.

TABLE 1

| Embodiment/Comparative Example | Bicyclic sulfate compound and its content | Compound represented by structural formula 1 | Other compounds and contents | The 500th cycle capacity retention rate (%) at 45° C. 1C | After 30 days of storage at 60° C. | | |
|---|---|---|---|---|---|---|---|
| | | | | | Capacity retention rate | Capacity recovery rate | Thickness expansion rate |
| Embodiment 1 | Compound 10: 1% | Compound 1: 1% | — | 84.1% | 83.8% | 88.7% | 15.2% |
| Embodiment 2 | Compound 11: 1% | Compound 2: 1% | — | 82.4% | 82.7% | 86.2% | 15.4% |
| Embodiment 3 | Compound 12: 1% | Compound 1: 1% | — | 82.2% | 82.7% | 87.4% | 14.4% |
| Embodiment 4 | Compound 13: 1% | Compound 2: 1% | — | 83.2% | 82.5% | 86.5% | 13.1% |
| Embodiment 5 | Compound 10: 2% | Compound 1: 1% | — | 86.4% | 85.2% | 90.1% | 10.4% |
| Embodiment 6 | Compound 10: 3% | Compound 1: 1% | — | 80.5% | 87.44% | 91.5% | 8.4% |
| Embodiment 7 | Compound 10: 1% | Compound 1: 2% | — | 87.4% | 88.2% | 92.5% | 8.1% |
| Embodiment 8 | Compound 10: 2% | Compound 1: 2% | — | 89.4% | 90.4% | 94.5% | 6.4% |
| Embodiment 9 | Compound 10: 1% | Compound 1: 0.5% | — | 80.1% | 81.6% | 86.9% | 15.3% |
| Embodiment 10 | Compound 10: 1% | Compound 1: 1% | VC: 1% | 88.8% | 84.1% | 88.7% | 18.2% |
| Embodiment 11 | Compound 10: 1% | Compound 1: 1% | FEC: 1% | 86.8% | 82.1% | 87.7% | 20.8% |
| Embodiment 12 | Compound 10: 1% | Compound 1: 1% | 1,3-PS: 1% | 84.4% | 90.4% | 94.7% | 10.4% |
| Embodiment 13 | Compound 10: 1% | Compound 1: 1% | DTD: 1% | 86.2% | 84.4% | 88.8% | 15.4% |
| Embodiment 14 | Compound 10: 1% | Compound 1: 1% | LiN(SO$_2$F)$_2$: 1% | 85.6% | 85.7% | 89.7% | 14.2% |
| Comparative Example 1 | Compound 10: 1% | — | — | 75.4% | 74.4% | 78.5% | 18.4% |
| Comparative Example 2 | Compound 10: 1% | — | VC: 1% | 80.6% | 75.1% | 80.5% | 21.5% |
| Comparative Example 3 | Compound 10: 1% | — | FEC: 1% | 79.8% | 72.2% | 77.8% | 25.5% |
| Comparative Example 4 | Compound 10: 1% | — | 1,3-PS: 1% | 75.9% | 80.4% | 85.4% | 11.1% |
| Comparative Example 5 | Compound 10: 1% | — | DTD: 1% | 77.3% | 76.7% | 81.5% | 15.6% |
| Comparative Example 6 | Compound 10: 1% | — | LiN(SO$_2$F)$_2$: 1% | 77.9% | 77.5% | 82.4% | 16.7% |

From the data of Embodiments 1~14 and Comparative Examples 1~6 in table 1, it can be seen that compared with adding bicyclic sulfate compound alone, adding both the bicyclic sulfate compound and the compound A represented by structural formula 1 can form a composite passivation film with better thermal stability on the surface of the negative electrode, and can obviously improve the high-temperature cycle and high-temperature storage performance of the battery. Meanwhile, it can be seen that the high-temperature cycle and high-temperature storage performance of the battery can be further improved with the increase of the content of compound A represented by structural formula 1.

Comparing the data of Embodiments 10~14 and Comparative Examples 2~6, it can be seen that in a mixed system of bicyclic sulfate compound, vinylene carbonate, fluoroethylene carbonate, 1,3-propane sultone, ethylene sulfate and $LiN(SO_2F)_2$, further adding the compound A represented by structural formula 1 can improve the high-temperature cycle and high-temperature storage performance of the battery.

In this specification and the appended claims, the singular forms "a," "an," and "the" include plural reference, unless the context clearly dictates otherwise. The above descriptions are only preferred embodiments and are not intended to limit the present invention. Any modifications, equivalent substitutions and improvements made within the spirit and principles of the present invention shall be included within the scope of protection of the present invention.

The invention claimed is:

1. A non-aqueous electrolyte for lithium ion battery, comprising a bicyclic sulfate compound and a compound A represented by structural formula 1:

Structural formula 1

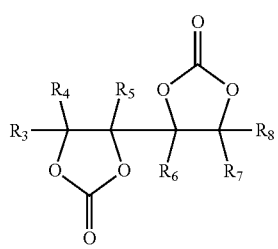

in structural formula 1, $R_3$, $R_4$, $R_5$, $R_6$, $R_7$ and $R_8$ are each independently selected from a group consisting of hydrogen, fluorine atom and a group containing 1-5 carbon atoms; and the percentage mass content of the compound A is 0.5%~5.0% and of the bicyclic sulfate compound is 0.1%~5.0% based on the total mass of the non-aqueous electrolyte for lithium ion battery being 100%.

2. The non-aqueous electrolyte for lithium ion battery of claim 1, wherein the group containing 1~5 carbon atoms is selected from hydrocarbyl, halogenated hydrocarbyl, oxygen-containing hydrocarbyl, silicon-containing hydrocarbyl, or cyano-containing substituted hydrocarbyl.

3. The non-aqueous electrolyte for lithium ion battery of claim 2, wherein $R_3$, $R_4$, $R_5$, $R_6$, $R_7$ and $R_8$ are each independently selected from hydrogen atom, fluorine atom, methyl group, ethyl group, methoxy group, ethoxy group, trimethylsiloxy group, cyano group, or trifluoromethyl group.

4. The non-aqueous electrolyte for lithium ion battery of claim 1, wherein the compound A represented by structural formula 1 is selected from the following compounds:

Compound 1

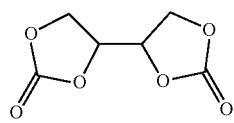

Compound 2

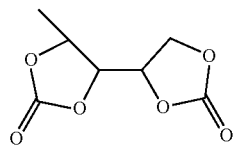

Compound 3

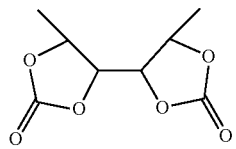

Compound 4

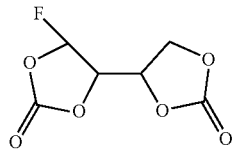

Compound 5

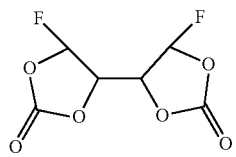

Compound 6

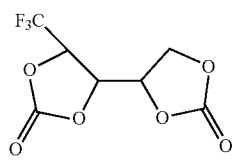

Compound 7

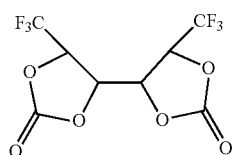

Compound 8

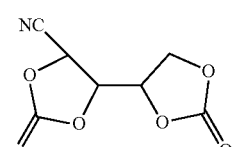

Compound 9

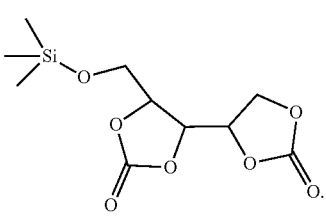

5. The non-aqueous electrolyte for lithium ion battery of claim 1, wherein the bicyclic sulfate compound is selected from compound B represented by structural formula 2 and/or compound C represented by structural formula 3:

Structural formula 2

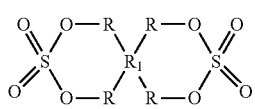

in structural formula 2, $R_1$ is

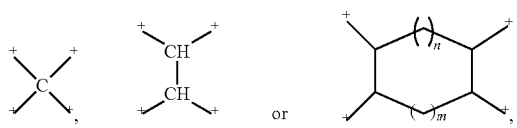

or

R is a single bond or methylene group; and m is an integer of 1-4, n is an integer of 0-2;

Structural formula 3

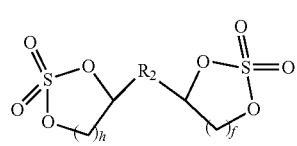

in structural formula 3, $R_2$ is a single bond, alkyl with 1-5 carbon atoms, oxyalkyl with 1-5 carbon atoms,

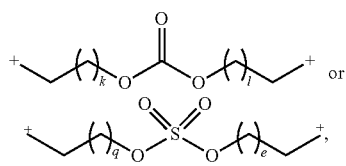

or

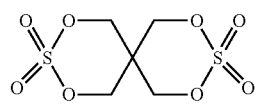

h and f are integers of 1 or 2, k, l, q and e are integers of 0-4.

6. The non-aqueous electrolyte for lithium ion battery of claim 5, wherein the compound B represented by structural formula 2 is selected from the following compounds:

Compound 10

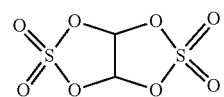

Compound 11 the compound C represented by structural formula 3 is selected from the following compounds:

Compound 12

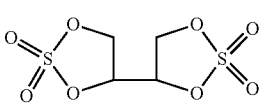

Compound 13

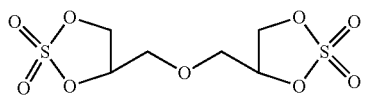

Compound 14

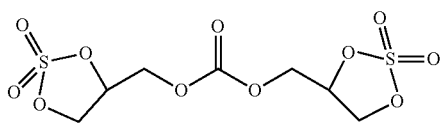

Compound 15

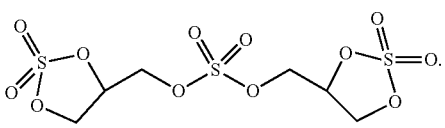

7. The non-aqueous electrolyte for lithium ion battery of claim 1, wherein the non-aqueous electrolyte further comprises at least one of unsaturated cyclic carbonate, fluorinated cyclic carbonate, cyclic sultone, and cyclic sulfate.

8. The non-aqueous electrolyte for lithium ion battery of claim 7, wherein the unsaturated cyclic carbonate comprises at least one of vinylene carbonate, vinyl ethylene carbonate, and methylene ethylene carbonate;

the fluorinated cyclic carbonate comprises at least one of fluoroethylene carbonate, trifluoromethyl ethylene carbonate and di-fluoro ethylene carbonate;

the cyclic sultone comprises at least one of 1,3-propane sultone, 1,4-butane sultone and prop-1-ene-1,3-sultone;

the cyclic sulfate is selected from at least one of ethylene sulfate and 4-methyl-1,3,2-dioxathiolane-2,2-dioxide.

9. A lithium ion battery, comprising a positive electrode, a negative electrode, a separator interposed between the positive electrode and the negative electrode, and the non-aqueous electrolyte for lithium ion battery of claim 1.

\* \* \* \* \*